(12) United States Patent
Garber

(10) Patent No.: US 6,408,270 B1
(45) Date of Patent: Jun. 18, 2002

(54) PHONETIC SORTING AND SEARCHING

(75) Inventor: David G. Garber, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/167,416

(22) Filed: Oct. 6, 1998

Related U.S. Application Data

(63) Continuation-in-part of application No. 09/107,865, filed on Jun. 30, 1998.

(51) Int. Cl.[7] .............................................. G10L 15/04
(52) U.S. Cl. ...................... 704/251; 704/254; 704/270.1
(58) Field of Search ................................ 704/251, 252, 704/253, 254, 231, 242, 270.1

(56) References Cited

U.S. PATENT DOCUMENTS

| | | | | |
|---|---|---|---|---|
| 4,315,482 A | * | 2/1982 | Cooper et al. .............. | 119/712 |
| 4,435,617 A | * | 3/1984 | Griggs ........................ | 704/254 |
| 4,748,670 A | * | 5/1988 | Bahl et al. .................. | 704/256 |
| 5,033,087 A | * | 7/1991 | Bahl et al. .................. | 704/256 |
| 5,058,166 A | * | 10/1991 | Ney et al. ................... | 704/254 |
| 5,241,619 A | * | 8/1993 | Schwartz et al. ........... | 704/200 |
| 5,278,943 A | * | 1/1994 | Gasper et al. .............. | 704/200 |
| 5,613,034 A | * | 3/1997 | Ney et al. ................... | 704/251 |
| 5,704,005 A | * | 12/1997 | Iwamida ..................... | 704/254 |
| 5,884,259 A | * | 3/1999 | Bahl et al. .................. | 704/252 |
| 6,016,471 A | * | 1/2000 | Kuhn et al. ................. | 704/266 |
| 6,029,132 A | * | 2/2000 | Kuhn et al. ................. | 704/260 |
| 6,073,099 A | * | 6/2000 | Sabourin et al. ........... | 704/256 |
| 6,173,263 B1 | * | 1/2001 | Conkie ....................... | 704/260 |
| 6,182,039 B1 | * | 1/2001 | Rigazio et al. ............. | 704/257 |
| 6,223,158 B1 | * | 4/2001 | Goldberg ................... | 704/252 |
| 6,224,384 B1 | * | 5/2001 | Jenkins et al. .............. | 434/185 |
| 6,230,131 B1 | * | 5/2001 | Kuhn et al. ................. | 704/266 |
| 6,233,553 B1 | * | 5/2001 | Contolini et al. .......... | 704/220 |

* cited by examiner

Primary Examiner—William Korzuch
Assistant Examiner—Abul K. Azad
(74) Attorney, Agent, or Firm—Lee & Hayes, PLLC

(57) ABSTRACT

A method of searching keyword phrases based on a search phrase includes a step of ordering the search phrase among the plurality of keyword phrases based on phoneme sequences of the search phrase and the keyword phrases, in accordance with a predefined phonetic search order. The search order is defined so that similar sounding phonemes are adjacent each other. Furthermore, sounds are ordered beginning with sounds made at the front of the mouth and proceeding in order with sounds made farther and farther back in the mouth. When searching for a particular search phase, the method includes returning any matching keyword phrase, as well as any keyword phrases that are adjacent the search phrase in the predefined phonetic search order.

31 Claims, 10 Drawing Sheets

PHONETIC SORTING AND SEARCHING

RELATED APPLICATIONS

This is a continuation-in-part application of a prior U.S. patent application entitled "Flexible Keyword Searching," filed Jun. 30, 1998, having Ser. No. 09/107,865, by inventors David G. Garber and Adam M. Feldstein.

TECHNICAL FIELD

This invention relates to search engines such as those used to locate Internet resources.

BACKGROUND OF THE INVENTION

The Internet is quickly becoming an important source for various types of information. A seemingly endless quantity of information is available for those with the patience to find it.

Various search engines are available for locating different Internet Web sites relating to specified topics. Generally a user enters a search string, and the search engine returns a list of resources that correspond in some fashion to the search string. The user peruses this list and navigates to different listed resources in an attempt to find one that meets the user's specific needs.

Search engines such as this generally work by matching keywords provided by the user with words contained in the Web sites themselves. Alternatively, search engines for a single Web site sometimes match user-provided keywords with predefined keywords associated with different resources within the site.

Although search methods such as this are good at finding resources, the relevancy of the resources varies depending on the search strings provided by the user. Furthermore, the search engines often returns tens, hundreds, or even thousands of uncategorized results—leaving the user with a significant task of sifting through search result listings to find specific items that might be interesting.

SUMMARY OF THE INVENTION

The invention includes a search engine for use with topics that are indexed by keywords or keyword phrases. In response to a user-provided search phrase, the search engine performs several levels of keyword searching, starting with a relatively exact matching search and proceeding with other searches that are increasingly less exact. Each less exact level of searching is performed only if the higher level yields no results.

One level of searching is performed on a phonetic level. The keyword phrases are converted to phonetic representations and are sorted in accordance with a predefined phonetic order. This phonetic order is defined such that similar sounds are located near each other. Furthermore, the predefined order begins with sounds produced at the front of the mouth, and proceeds in order with sounds made further and further back in the mouth.

When searching for a particular search phrase, it is converted to a phonetic representation and is then sorted with the keyword phrases to find its relative location within the keyword phrases—used the predefined phonetic order mentioned above. Then, any keyword phrases that either match the search phrase or that are neighbors of the search phrase in the sorted order are identified as search results.

DETAILED DESCRIPTION

General Environment

Figure 1:
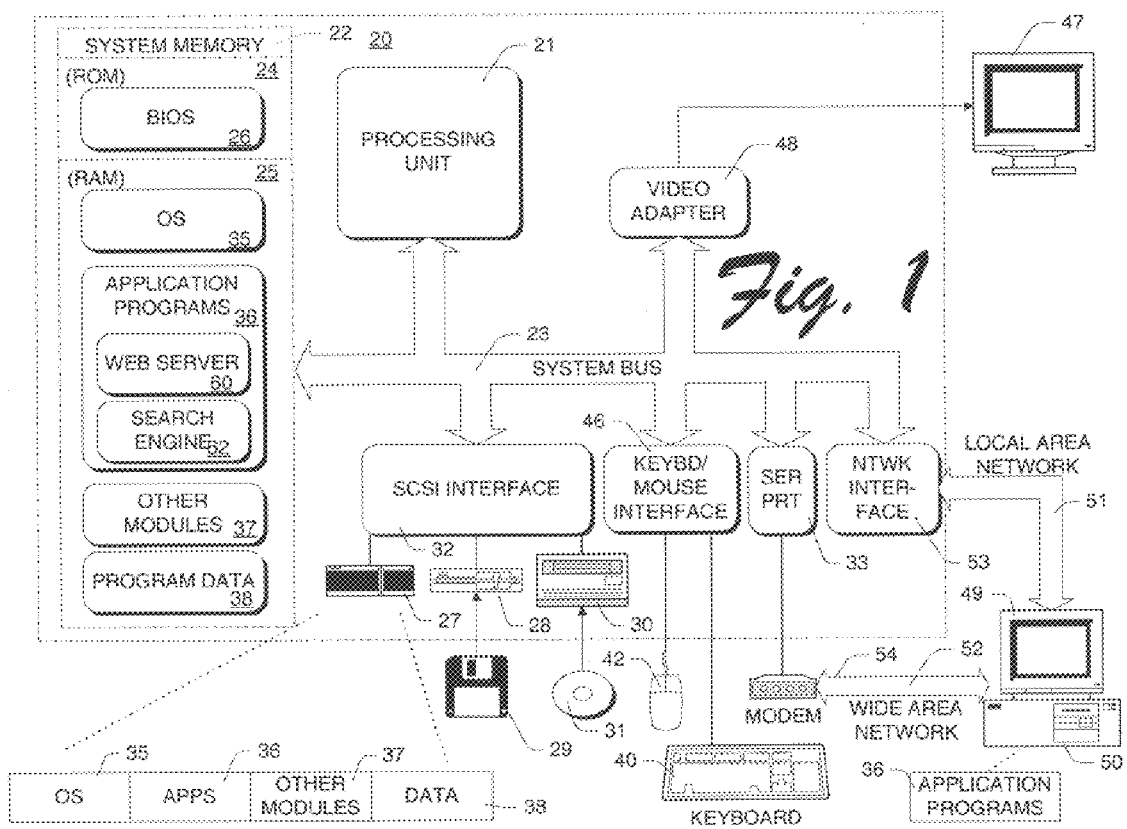
FIG. 1 is a block diagram of a client/server network system in accordance with the invention.

FIG. 1 shows a client/server network system in accordance with the invention. FIG. 1 and the related discussion provide a brief, general description of a suitable computing environment in which the invention may be implemented. Although not required, the invention will be described in the general context of computer-executable instructions, such as program modules, being executed by a conventional personal computer that is configured in a network environment as a server. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. In a distributed computer environment, program modules may be located in both local and remote memory storage devices.

With reference to, FIG. 1, an exemplary system for implementing the invention includes a general purpose computing device in the form of a network server computer 20, including one or more processors or processing units 21, a system memory 22, and a system bus 23 that couples various system components including the system memory to processors 21.

The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within server computer 20, such as during start-up, is stored in ROM 24. The server computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by an SCSI interface 32 or some other appropriate interface. The drives and their associated computer-readable media provide nonvolatile storage of computer readable instructions, data structures, program modules and other data for the server computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 29 optical disk 31, ROM 24, or RAM 25, including an operating system 35, one or more application programs 36, other program modules 37, and program data 38. A user may enter commands and information into the server computer 20 through input devices such as keyboard 40 and pointing device 42. Other input devices (not shown) may include a microphone, joystick, game pad, satellite dish, scanner, or the like. These and other input devices are connected to the processing unit 21 through an interface 46 that is coupled to the system bus. A monitor 47 or other type of display device is also connected to the system bus 23 via an interface, such as a video adapter 48. In addition to the monitor, personal computers typically include other peripheral output devices (not shown) such as speakers and printers.

The server computer 20 operates in a networked environment using logical connections to one or more remote client computers, such as a client computer 49. The client computer 49 may be another personal computer, a server, a router, a network PC, a peer device, or other common network node, and typically includes many or all of the elements described above relative to the personal computer 20, although only a memory storage device 50 has been illustrated in FIG. 1. The logical connections depicted in FIG. 2 include a local area network (LAN) 51 and a wide area network (WAN) 52. Such networking environments are commonplace in offices, enterprise-wide computer networks, intranets, and the Internet. In the described embodiment of the invention, client computer 49 executes an Internet Web browser program such as the "Internet Explorer" Web browser manufactured and distributed by Microsoft Corporation of Redmond, Wash.

When used in a LAN networking environment, the server computer 20 is connected to the local network 51 through a network interface or adapter 53. When used in a WAN networking environment, the server 20 typically includes a modem 54 or other means for establishing communications over the wide area network 52, such as the Internet. The modem 54, which may be internal or external, is connected to the system bus 23 via a serial port interface 33. In a networked environment, program modules depicted relative to the personal computer 20, or portions thereof, may be stored in the remote memory storage device. It will be appreciated that the network connections shown are exemplary and other means of establishing a communications link between the computers may be used.

Generally, the data processors of computer 20 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods, and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

In accordance with the invention, application programs 36 include a server application program that provides resources and services to various requesting remote clients. Specifically, the server application acts as an Internet Web server, providing various "documents" (also referred to as "pages") containing multimedia information. Application programs 36 further include a search engine 62 that accepts search terms and that finds appropriate resources based on the search terms. The functions of search engine 62 are explained below.

Basic Data Architecture

In the embodiment described herein, server computer 20 is an Internet server that implements a conventional Internet Web site. Such a Web site has a plurality of different pages, each presenting different informational topics. Web pages like this will be referred to generally herein as topic resources or simply as topics. Generally, a client submits a search query in the form of a search phrase or character string. The server responds by returning a document to the client. In accordance with the invention, the returned document is either one of the topic resources itself, or a list of topic resource hyperlinks for selection by a user. The process of returning a particular document to the client for presentation to the user is referred to herein as "rendering" the document.

Microsoft's "CarPoint" Web site is an example of such a system, found on the Internet at "http://carpoint.msn.com". This Web site contains numerous topics relating to specific makes and models of automobiles. A user can navigate among the various topics by selecting from menus and hyperlinks. In addition, a user can enter a search phrase to specify a particular informational topic. In response to the search phrase, the server computer locates one or more topics related to the search phrase and either automatically displays one of the topics or displays a result page containing a list of topics. From a result page, a user can select and view any one of the listed topics. The term "navigate" is often used to indicate a process such as this of identifying and rendering a particular Web document for presentation to a user.

Figure 2:
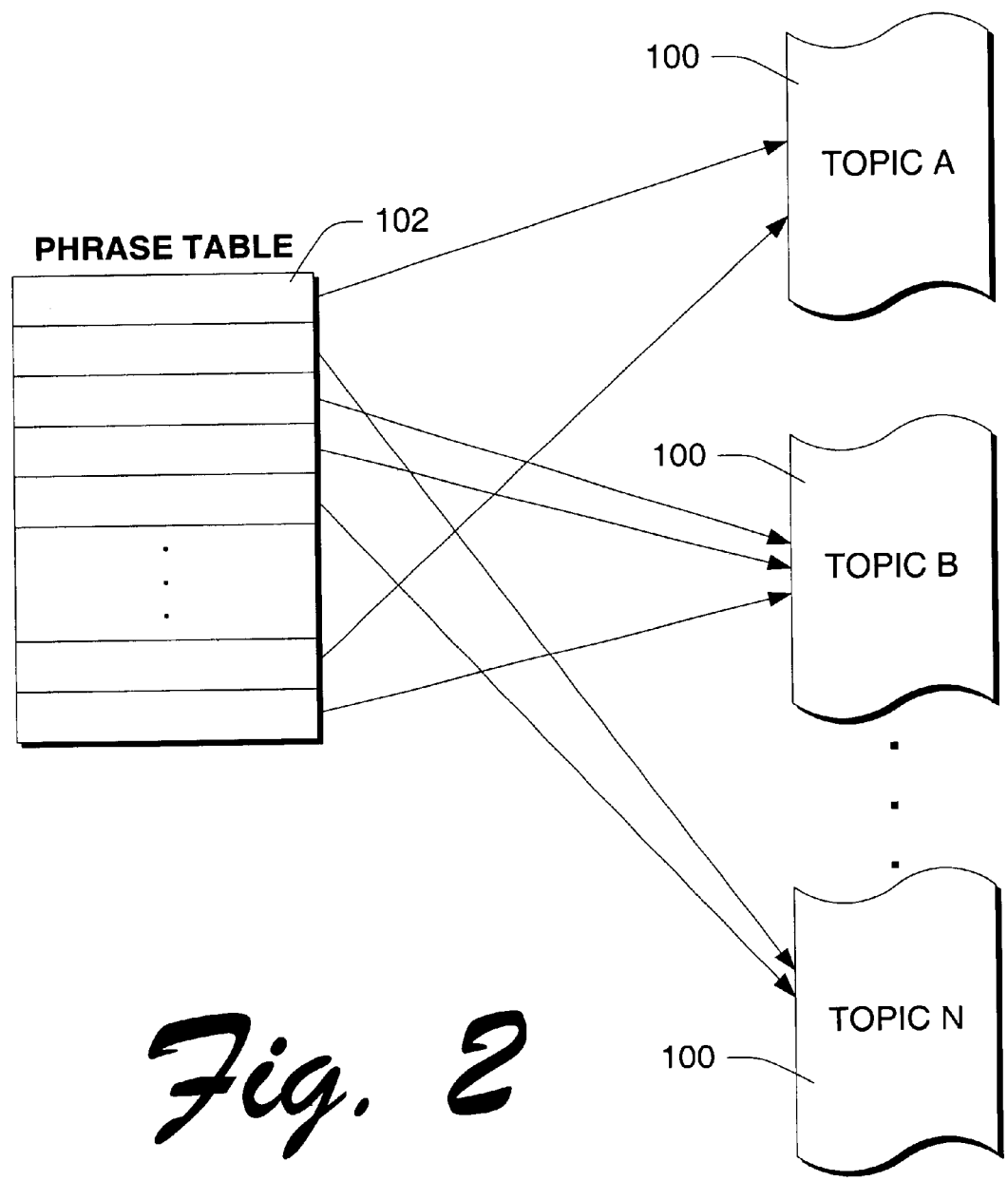
FIG. 2 is a block diagram showing a data architecture in accordance with one embodiment of the invention.

FIG. 2 shows one architectural structure for the data maintained and accessed by server 20, including various topics 100 and a keyword phrase table 102. The phrase table and various topics are preferably stored in the non-volatile memory of server 20, although they could alternatively be stored remotely for network access by server 20.

Each topic is an HTML (hypertext markup language) document for transmission to and display on a user's Web browser. Each topic resource is identified by a traditional URL (uniform resource locator) or some other file specification.

The keyword phrase table 102 is an index of searchable keyword phrases. Each entry of the keyword phrase table references a single topic 100 that is associated with the entry's keyword phrase.

An example of keyword phrase table 102 is shown in Table 1. The phrase table has a plurality of entries (rows), corresponding to a plurality of keyword phrases. An actual table would have potentially hundreds or thousands of entries. The term "phrase" as used herein indicates one or more terms or words that form a character string.

TABLE 1

| Keyword Phrase | Phonetic Spelling | Topic URL | Action |
| --- | --- | --- | --- |
| Mustang | mstng | m.htm | 1 |
| VW | vw | vw.htm | 1 |
| Ford | frd | fd.htm | 1 |
| Lumina | lmn | lm.htm | 1 |
| Pony Car | pncr | m.htm | 2 |
| Bucket Seats | bktsts | bk.htm | 2 |

The keyword phrases are generated by a human content editor for various available topics. Thus, each topic is associated with one or more keyword phrases. The keyword phrases consist of key concepts or items described by the associated topics. As an example, a topic describing a "Toyota Tercel" might have two keyword phrases: "Toyota" and "Tercel". In some cases, it might be desirable to also include the combined words "Toyota Tercel" as a keyword phrase.

There are one or more entries in keyword phrase table 102 for each keyword phrase. Each entry is associated with a single keyword phrase and references a single topic. The table is searchable by the keyword phrases.

In addition to a keyword phrase, each entry also contains a phonetic spelling of the keyword phrase. Although a preferred method of formulating phonetic spellings will be described in detail below, the phonetic spellings can potentially be obtained in different ways. One simple formula for converting a keyword phrase to its phonetic equivalent is to simply remove all spaces and vowels, as is illustrated in Table 1.

Each entry also contains a topic ID, which in this example is a URL indicating the location of the topic resource associated with the table entry and its keyword phrase.

Finally, every entry indicates a keyword action. A keyword action indicates a default step that should potentially be taken upon matching the associated keyword phrase. More specifically, each phrase table entry (and thus each keyword phrase) is associated with one or more actions selected from a plurality of predefined actions. The actions are specified as numerical codes. Each action or action code indicates a step that should be performed whenever the table entry is identified as the result of a search. For example, one action code might indicate that the topic indicated by the topic ID of the table entry should be automatically rendered, without any further user intervention. Another action might consist of simply displaying the topic ID or URL in a "result" list for examination and selection by the user.

Search and Navigation Methodology

Figure 3:
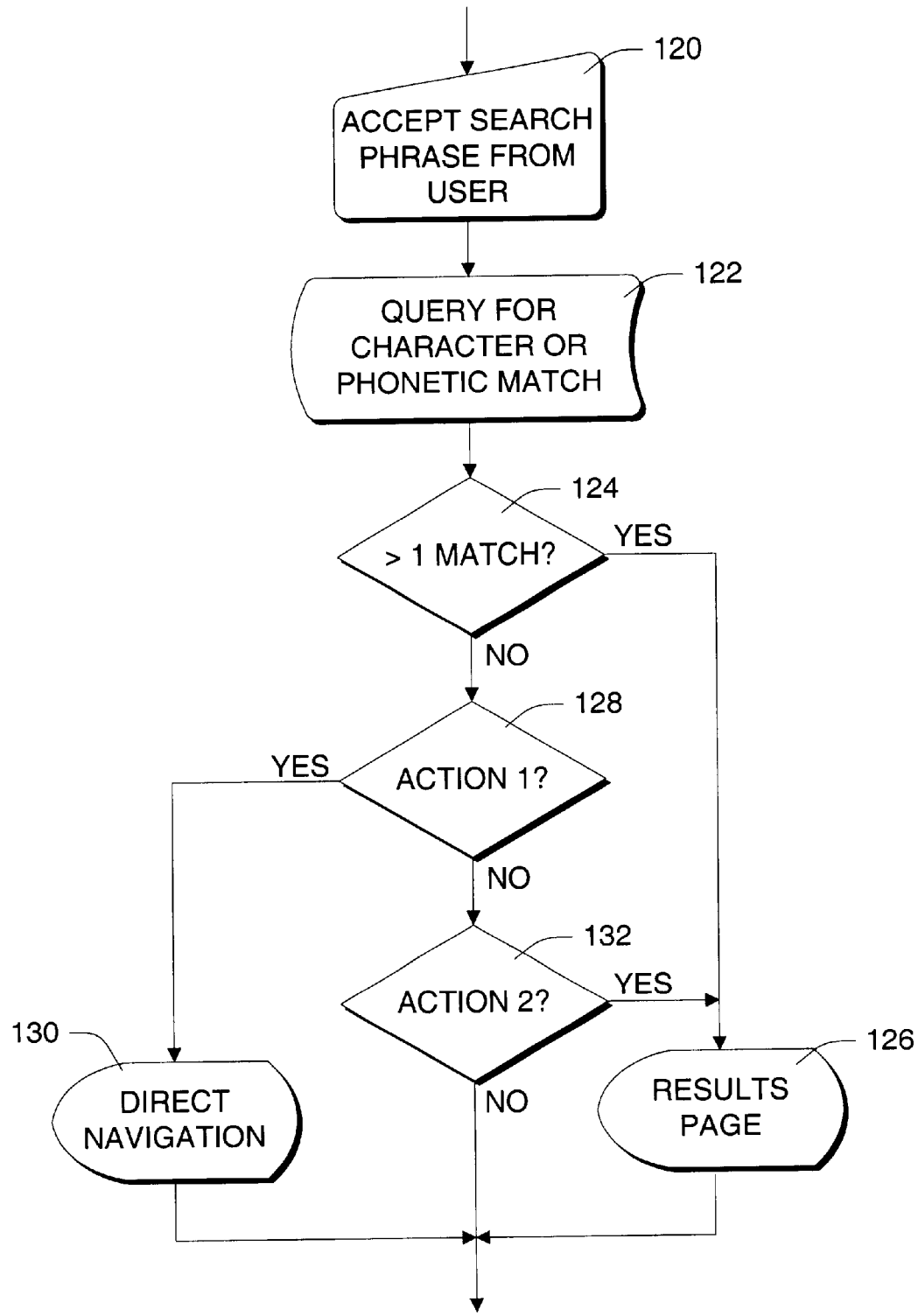
FIG. 3 is a flowchart showing preferred searching and navigation steps in accordance with the invention.

FIG. 3 illustrates steps that are performed in one embodiment of the invention for finding or identifying information resources. A step 120 comprises accepting a search phrase from a user and presenting such resources to a user. The phrase might comprise a single word or a plurality of words. It might contain alphabetical and numerical characters as well as other characters such as punctuation, asterisks, ampersands, etc.

Step 122 comprises matching the search phrase with one or more keyword phrases—searching the keyword phrase table for a keyword phrase and a corresponding entry that matches the search phrase. The keyword phrase table is normally maintained as part of a database, so that this step commonly involves querying the database with the search phrase. The search strategy involves first attempting to match the user's search phrase with a keyword phrase from the keyword phrase table. If this fails, the search phrase is converted to its phonetic equivalent and an attempt is made to match the phonetic version of the search phrase with a phonetic spelling of a keyword phrase from the keyword table.

For purposes of discussion, assume that the database query of step 122 identifies one or more matching keyword phrases and table entries, indicating either a character match or a phonetic match with one or more keyword phrases. Note that it is very possible for the query to identify more than one entry from a single search phrase. One reason for this is that the same keyword phrase can be specified in more than one entry, associated with a different topic ID in each entry. Another reason is that two different keyword phrases might have the same phonetic spelling, so that a given search phrase phonetically matches two different keyword phrases.

Step 124 comprises determining whether the query has indeed identified more than one matching table entry. If it has, execution proceeds with step 126, which comprises listing the topic identified in the matched table entry as a hyperlink on a "results" page, along with any other topics identified during the search. If, on the other hand, only a single entry was identified, a step 128 is performed of determining whether the action code contained in the identified table entry equals the value "1". If so, execution branches to step 130, which comprises initiating the action specified by the action code. In this example, action code 1 indicates an action of immediately and automatically rendering the topic referenced by the table entry's topic ID. Step 130 therefore comprises sending the referenced topic to the client for rendering on the client's Web browser.

If the result of step 128 is false, execution branches to step 132, which is a determination of whether the action code of the single identified table entry is equal to the value "2". In this example, action code 2 indicates that the topic is to be listed as a hyperlink on a results page. If this test is true, step 126 is executed, which comprises displaying the result page. If the result of step 132 is false, the search procedure ends without returning any results to the user, but displaying some type of message indicating that the search failed.

Multiple Search Levels

Figure 4:
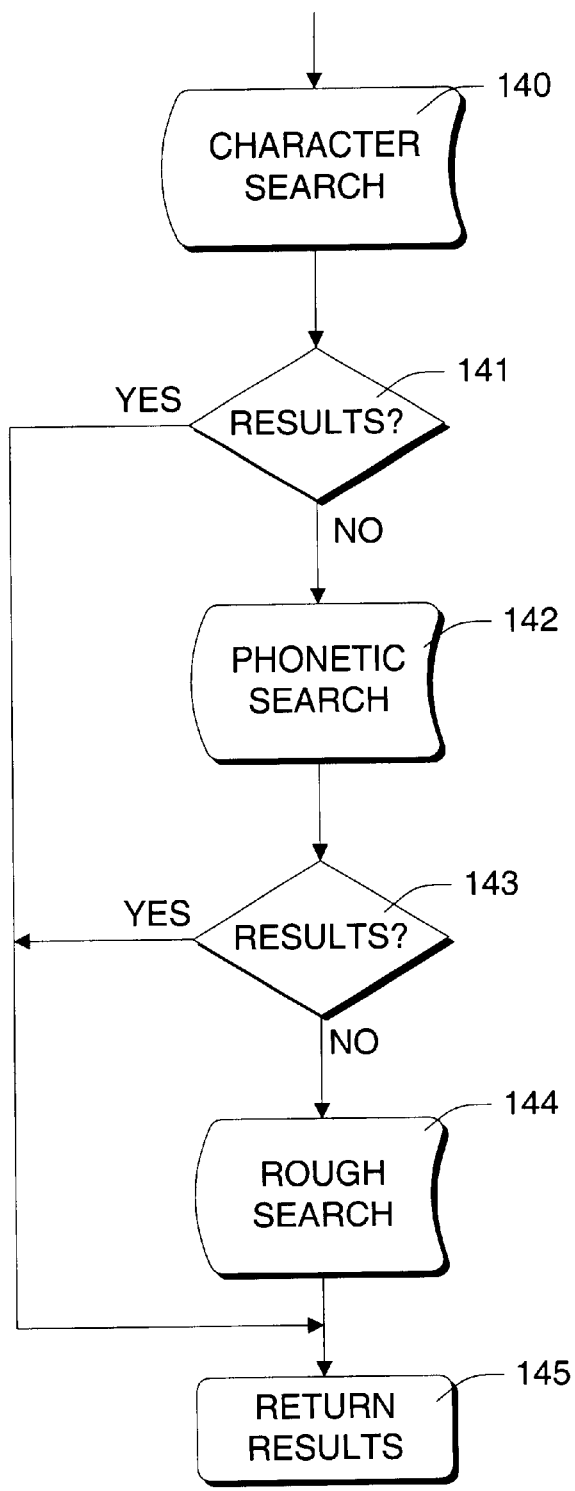
FIGS. 4 and 5 are flowcharts showing preferred searching steps in accordance with the invention.

As an improvement over the search methodology described above, a multi-level search strategy is illustrated in FIG. 4. This type of search begins with a character search 140 as a first level of searching. In the character search, a search phrase is matched, character-by-character, with one or more keyword phrases. If the character search is unsuccessful (decision block 141) a phonetic search 142 is conducted, in which a phonetic representation of the search phrase is matched with phonetic representations of one or more keyword phrases. If the phonetic search is unsuccessful (decision block 143), a "rough" search 144 is conducted. A rough search is a search other than a character or phonetic matching search. The rough search might involve several different strategies, such as finding keyword phrases that are alphabetically or phonetically similar to the search phrase, without being exact matches. The rough search always returns one or more "matching" topics.

After success at any level of searching, the search engine returns the results in a step 145.

Figure 5:
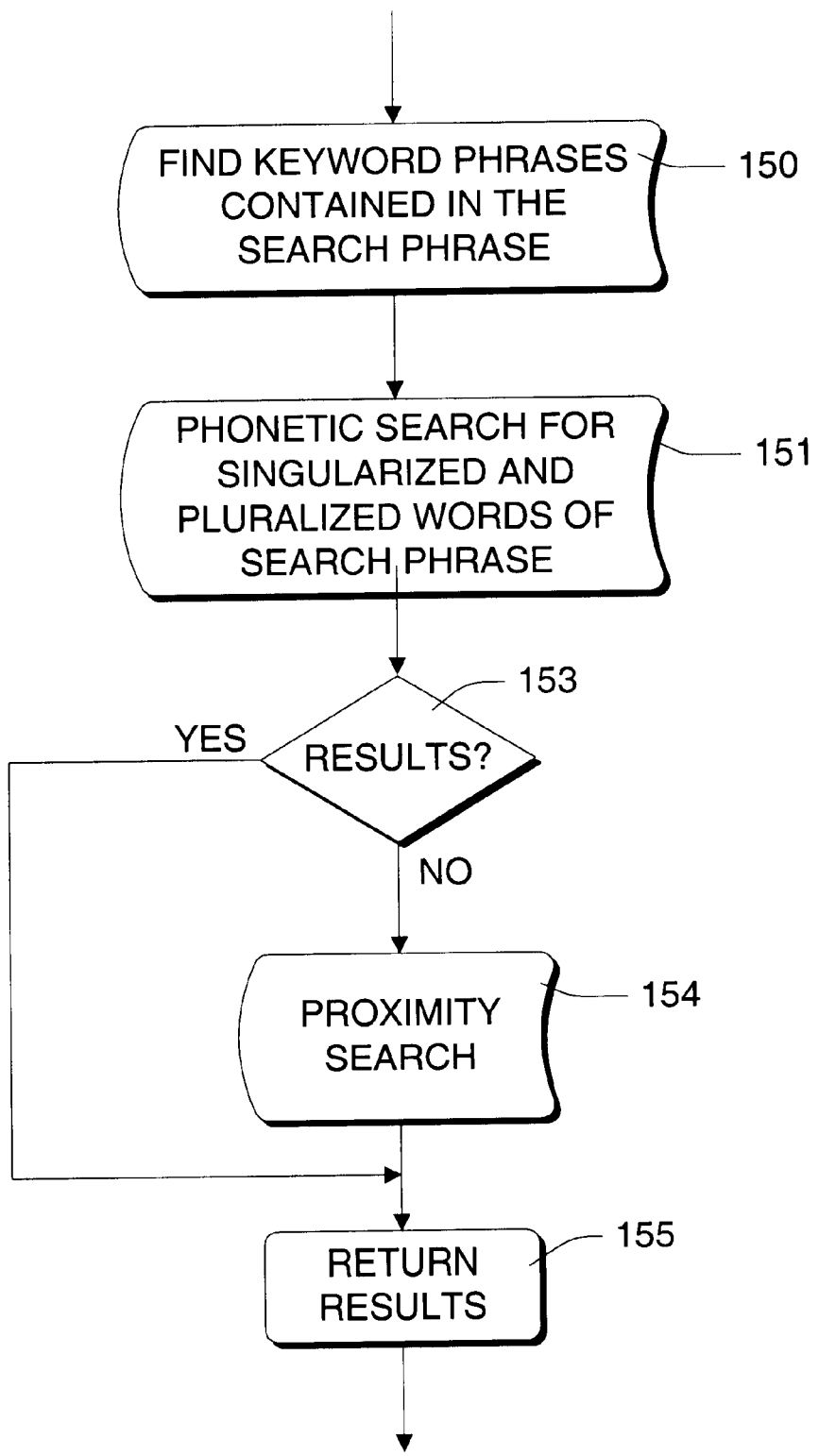

FIG. 5 shows steps involved in rough search 144. An initial step 150 of the rough search comprises identifying any keyword phrases that are words, sub-strings, or sub-phrases of the search phrase. A subsequent step 151 of the rough search comprises identifying any keyword phrases that match singularized and/or pluralized phonetic forms of the individual words of the search phrase (after removing prepositions and similar "non-meaning" words from the search phrase). As will become apparent in the discussion below regarding phonetic encoding and searching, pluralizing and singularizing phonetically encoded words is relatively more simple than performing the same task on the actual, non-encoded words of the search phrase.

If steps 150 and 151 yield no results (decision 153) a step 154 is performed of identifying any keyword phrases that are alphabetically or phonetically near the search phrase. This step involves identifying the two keyword phrases that surround the search phrase in an alphabetical sorting of the phrases, and the two keyword phrases that surround the search phrase in a phonetic sorting of the phrases. The results are limited to keyword phrases that start with the same phoneme as the search phrase. The proximity search will yield at least two results in most cases. Any results found during the steps described above are returned in a step 155.

As an example of step 154, assume that a keyword phrase table contains the following keyword phrases:

Mazda

Maxima

Marquee

Masthead

Now assume that a user submits "Masda" as a search phrase, actually looking for information on "Mazda" automobiles. Alphabetically, the nearest words are "Marquee" (before) and "Masthead" (after), so "Mazda" would not be found.

Now consider the nearest words under a phonetic representation of the keyword phrases and the search phrase. In accordance with the method described below of converting phrases to their phonetic equivalents, the keyword phrases have phonetic equivalents as follows:

| Keyword | Phonetic |
|---|---|
| Mazda | ULH |
| Maxima (Mxm) | UQU |
| Marquee (mrq) | UTP |
| Masthead (msthd) | UMGH |

The phonetic representation of the search phrase "Masda" is UMH. Accordingly, the keywords on opposite sides of "Masda" using this phonetic encoding are "Masthead" (before) and "Maxima." However, in accordance with the invention, phonetic encodings having the same length are given highest priority when sorting, so that "ULH" is considered phonetically "closer" to "UMH" than is "UMGH". Accordingly, this portion of the rough search will indicate "Mazda" as being adjacent the search phrase "Masda" in a phonetic ordering.

The results of both the alphabetic proximity search and the phonetic proximity search are returned in step 155.

Different Keyword Actions For Different Search Levels

When conducting a multi-level search such as described above, different actions can be specified for a single entry of the keyword phrase table. An example of a keyword phrase table having three different actions for each entry is shown as Table 2:

TABLE 2

| Keyword Phrase | Phonetic Spelling | Topic URL | Action A (char) | Action B (phonetic) | Action C (rough) |
|---|---|---|---|---|---|
| Mustang | tlhv | m.htm | | | |
| VW | da | vw.htm | | | |
| Ford | esg | fd.htm | | | |
| Lumina | rtu | lm.htm | | | |
| Pony Car | pncr | m.htm | | | |
| Lemon | rtu | no.htm | 1 | 0 | 0 |
| Bucket Seats | bohlhl | bk.htm | | | |

The different actions correspond to different ways of matching the search phrase with a keyword phrase. Action A indicates a step that should be initiated if an entry is identified as a result of a character search (step 140 of FIG. 4). Action B indicates a step that should be initiated if an entry is identified as a result of a phonetic search (step 142 of FIG. 4). Action C indicates a step that should be initiated if an entry is identified as a result of a rough search (step 144 of FIG. 4).

With the option of specifying three different actions, the search engine can be configured to respond differently to the same phrase table entry, depending on the "exactness" of the match. A character match is considered exact, and might often result in direct navigation to the topic indicated by the table entry. A phonetic match is considered somewhat less exact, and might or might not cause direct navigation to a topic. A rough match is relatively inexact, and would in most cases cause the corresponding topic to be listed only as a "suggested" hyperlink on a results page. These behaviors are configurable for each table entry, using the fields shown above.

For simplicity in discussing remaining aspects of the invention, these alternative actions are not discussed explicitly in most of the following discussion. Rather, when an action is referred to, the action is assumed to be whichever action is appropriate for a particular entry, depending on how the entry was matched or found. Alternatively, an action that is to be performed in response to a character match search will be referred to as a "character match action." An action that is to be performed in response to a phonetic search will be referred to as a "phonetic match action." An action that is to be performed in response to a rough search will be referred to as a "rough match action."

Action Definitions and Priorities

In an actual embodiment of the invention, there are seven defined actions, having codes 0–6. The actions are prioritized, with action 0 having the highest priority and action 6 having the lowest priority. The priorities allow the search engine to resolve situations in which multiple table entries are identified, without always reverting to the result page in this situation. Thus, the action priorities allow the search engine to automatically display a high-priority topic as the result of a search even when the search yields multiple topics.

Specifically, if multiple table entries are found in a search, the action having the highest priority will be initiated. If there is a tie for the highest priority, all of the entries (except those with action 0) will be listed on a results page. The actions will determine the location on the results page of the different entries.

Each action is a step that is to be potentially performed relative to the topic ID or URL of the table entry in which the action is set forth. Actions 1–3 all indicate a step of immediately and automatically rendering the associated topic (the topic specified by the entry's topic ID). These actions are referred to as "direct navigation" actions, since they cause direct navigation to an entry's topic. The availability of three different actions of this type, having different priorities, allows certain table entries to take precedence over others when a search identifies multiple results. If there is not a tie for the highest priority, the entry having the action with the highest priority is selected, and its topic is immediately displayed. If there is a tie for the highest priority among the actions of the matched phrase table entries, the result page is displayed rather than performing any of the indicated actions. Whenever a result page is displayed, it lists all topics found in the search (except those referenced by matched phrase table entries specifying action 0).

Action 1 is reserved for use with special action 0 to provide handling for so-called "forbidden" or "no-response" words. "Lemon" is an example of such a word in the automotive environment—it would be undesirable to inadvertently match "Lemon" with an automobile having a phonetically similar name, such as "Lumina." Swear words are other examples of "no-response" words. In the described embodiment of the invention, the search engine responds to these words by rendering a pre-defined topic stating that the search was unsuccessful, and perhaps suggesting some general topics of interest (such as a table of contents). Within the data architecture described, a no-response word such as "lemon" is specified in a table entry as follows:

TABLE 3

| Keyword Phrase | Phonetic Spelling | Topic URL | Action A (char) | Action B (phonetic) | Action C (rough) |
|---|---|---|---|---|---|
| Lemon | lmn | no.htm | 1 | 0 | 0 |

The URL "no.htm" specifies a predefined topic indicating that the matching search was unsuccessful. If the table entry is found as the result of a character search, indicating that the user entered the actual word "lemon", action 1 is initiated—the predefined topic is rendered, to the exclusion of all other topics (only "no-response" table entries specify action 1, and action 1 has the highest priority other than action 0). If the table entry is found as the result of a phonetic search or a rough search, action 0 is initiated. Action 0 is a special action indicating that the table entry is to be hidden from the user—essentially ignored by the search engine in these special situations. An entry such as this can only be matched if the user enters the exact keyword phrase. Thus, a search phrase such as "Lemon", will not be matched with this table entry (even though it is a phonetic match for "lemon"). Rather, the "no.htm" topic will be displayed only as a result of an exact match with a specially defined "no-response" word.

Actions 4–6 indicate that their corresponding topics are to be listed on a results page. With actions 4 and 5, the topics are listed as hyperlinks in respective lists, so that a user can manually select whether to navigate to a particular topic. With action 6, the topics are listed in their entirety on the results page. Topics that are the object of action 6 are generally very short (no more than three or four lines).

As an example of how these different types of actions can be used, consider the following four phrase table entries and their corresponding topics:

| | |
|---|---|
| "Lemon" | "no match" topic |
| "Lumina" | topic for the Chevrolet Lumina |
| "Lumina" | topic for a fictitious trim option for a Chevrolet Celebrity |
| "Lemmon" | topic describing a fictitious new trim option named after actor Jack Lemmon |

Actions could be assigned as follows:

TABLE 4

| Keyword Phrase | Action A (char) | Action B (phonetic) | Action C (rough) |
|---|---|---|---|
| Lemon | 1 | 0 | 0 |
| Lumina (model) | 2 | 2 | 4 |
| Lumina (trim) | 3 | 4 | 4 |
| Lemmon | 3 | 4 | 4 |

Following are some examples of search phrases and the results that they would produce based on the actions specified in Table 4.

| | |
|---|---|
| "Lemon" | go directly to the "no match" topic |
| "Lumina" | go directly to the topic for the Chevrolet Lumina |
| "Lemmon" | go directly to the topic describing a fictitious new trim option named after actor Jack Lemmon |
| "Lummina" | go directly to the Chevrolet Lumina topic based on a phonetic matching |
| "Lemona" | go directly to the Chevrolet Lumina topic based on a phonetic matching |
| "Lime" | no character or phonetic matches, so all three topics (other than the "Lemon" "no match" topic) are listed as the result of a rough match. |

In other words, typing any word exactly will go a corresponding topic, except for the keyword "Lumina", which shows a preference for the Lumina model rather than the Lumina trim. Typing a phonetic match for "Lumina" will always go to the Lumina model topic since, again, the phonetic actions give the model topic priority over the trim topic. A rough match lists everything on a result page.

If the designer is concerned that the Lumina trim level is too obscure using this technique, the trim entry can be promoted to the same priority as the model entry, which would result in more ties and more times when the result page is displayed.

Action 0 has the highest priority. Action 1 has the second highest priority. Action 2 has the third highest priority.

Action 3 has the fourth highest priority. Action 4 has the fifth highest priority. Action 5 has the sixth highest priority. Action 6 has the seventh highest priority.

Figure 6:
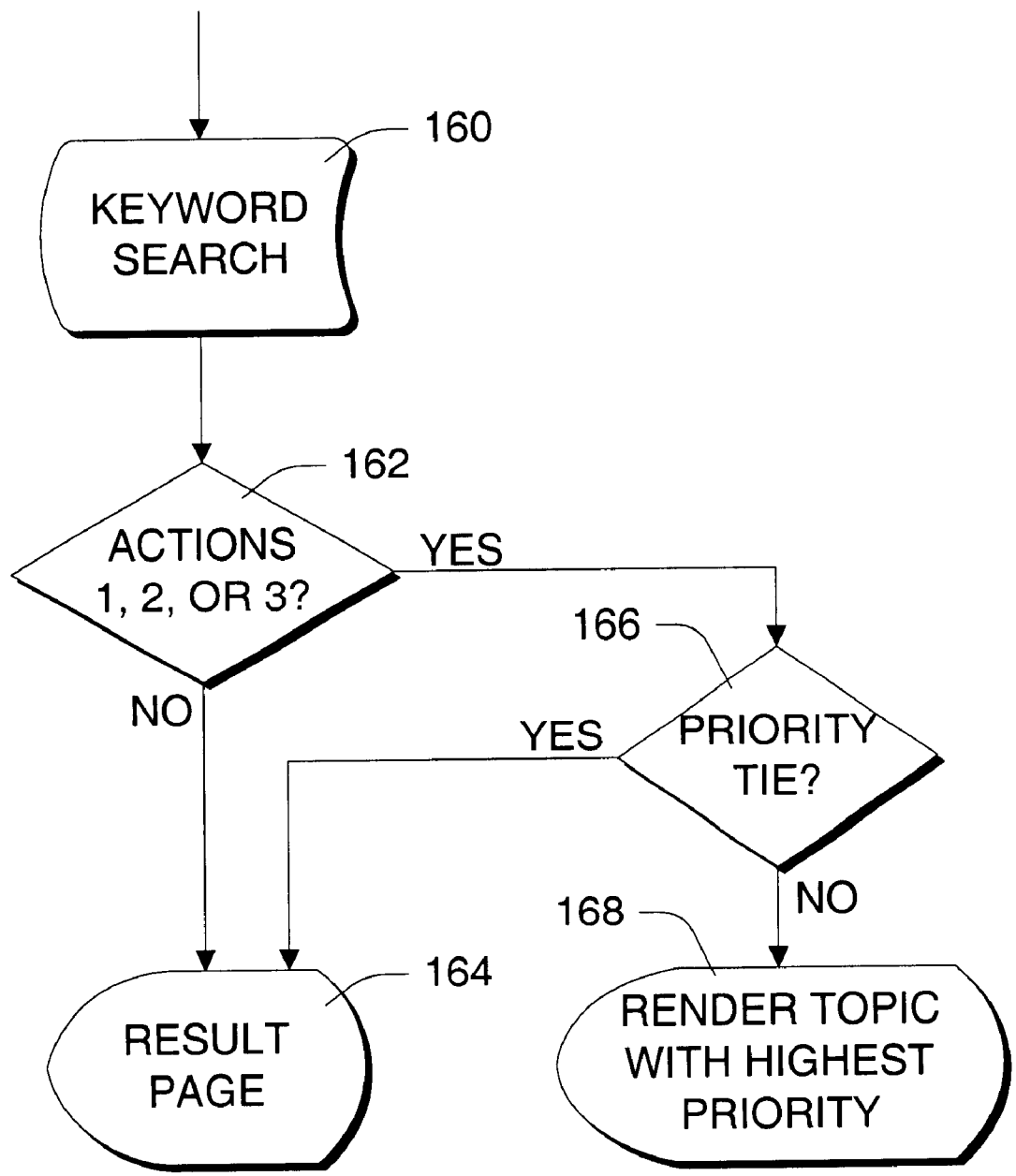
FIG. 6 is a flowchart illustrating an aspect of the invention in which different topics have respective actions that are performed depending on their priorities.

FIG. 6 illustrates how the actions are implemented, accounting for multiple keyword phrase matches with different actions and different action priorities. An initial step 160 comprises: performing a search for matching keywords, as already described above. The search potentially returns multiple matching keyword phrases and corresponding matching phrase table entries. The terms "match" and "matching" as used herein indicate some correspondence between a search phrase and a keyword phrase, not limited to an exact character or phonetic match.

Each of the matching phrase table entries specifies an action. Among the actions, one has the highest priority. It is possible that more than one of the matching entries will specify this same action, resulting in a priority tie between two or more of the matching entries.

A step 162 comprises determining whether any of resulting phrase table entries indicate actions of the "direct navigation" type, which are actions 1, 2, and 3. If none of the entries indicate direct navigation, a result page is displayed in a step 164. The result page contains references to all topics found during the search.

If one or more of the entries indicate direct navigation actions, a step 166 is performed, comprising determining whether there is a tie between any of the entries for an action having the highest priority. Stated alternatively, this step involves determining whether two or more of the matched keyword phrases are associated with the action having the highest priority of the actions specified by the matching entries. If there is a tie, execution branches to step 164, which comprises listing references to the matched topic resources regardless of the specified actions. If only one of the matched phrase table entries has an action with the highest priority, a step 168 is performed of rendering the topic referenced by that entry.

Result Pages

Figure 7:
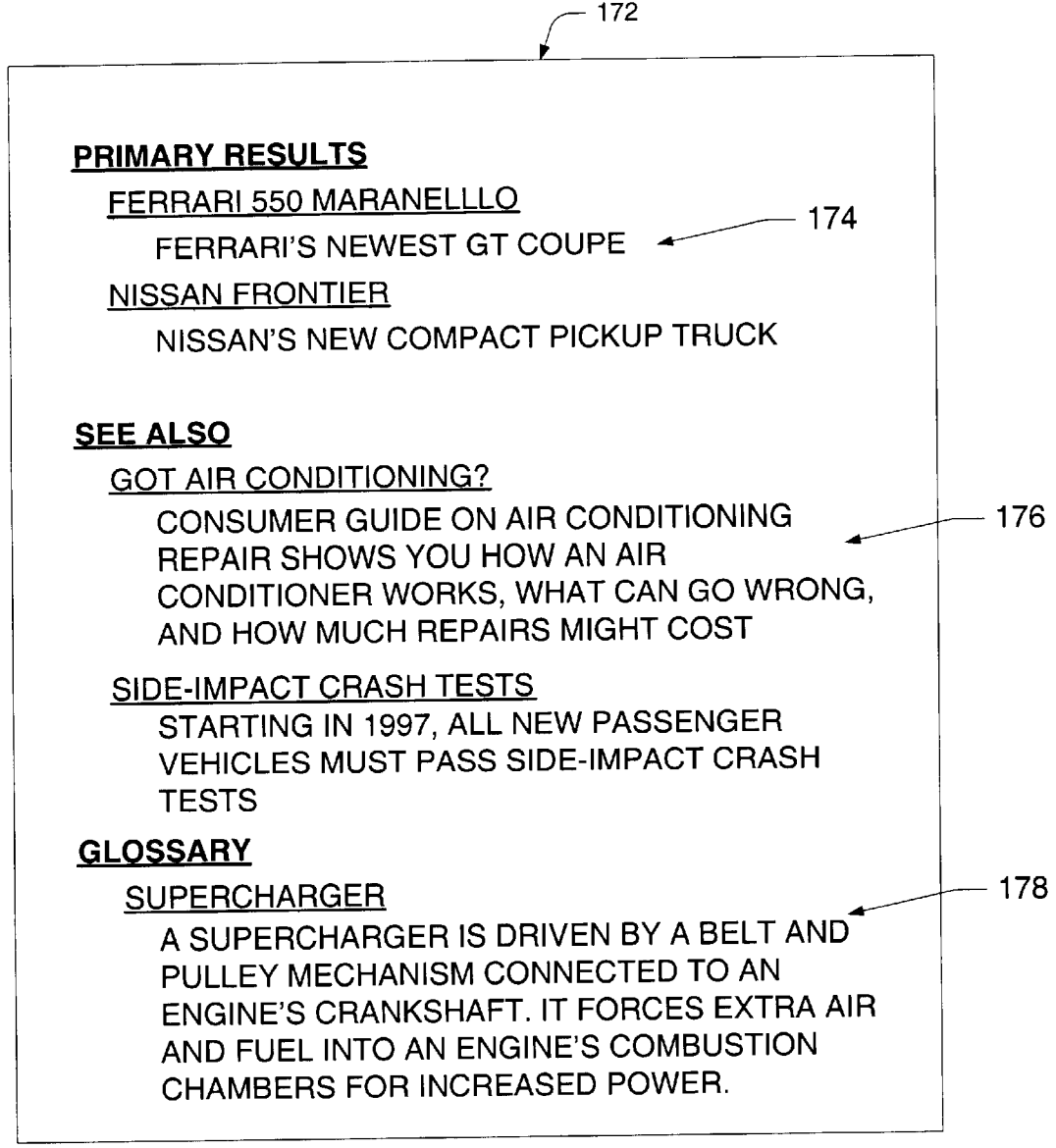
FIG. 7 shows an example of a results page in accordance with the invention.

FIG. 7 shows an example of a result page. Such a result page is displayed either when the highest priority among the actions specified by the identified matching table entries is 4, 5, or 6, or when there is a tie for the highest priority (in which case the "direct" actions are overridden). The result page has as many as three different lists of hyerlink selections. A first of the lists, generally indicated by reference numeral 174, contains primary suggestions for topics corresponding to the user's search phrase. This list contains the topic IDs or URLs resulting from any keyword entry tables having actions 2–4. A second of the lists, generally indicated by reference numeral 176, contains secondary suggestions for topics (also referred to as "see-also" topics) corresponding to the user's search phrase. This list contains the topic IDs or URLs resulting from any keyword entry tables having action 5. A third of the lists, generally indicated by reference numeral 178, contains glossary definitions, comprising topics having keywords matching the user's search phrase. This list contains the topics corresponding to any keyword entry tables having action 6 (hyperlinks are not necessary, since the entire topic is embedded in the results page).

A results page in accordance with the invention might of course be formatted in many different ways, and different topics can be categorized according to different criteria. As just one example, topics can be associated with predefined types (as will be described below), and then segregated by type within a results page. Alternatively, or in addition, the format of the results page might vary depending on how the search results were found. For example, search results found as a result of a proximity search might be presented differently than results found as the result of a character search.

Multi-Table Architecture

Although the architecture shown above is very useful, it requires entry of alternative actions for each different phrase table entry. An improved, multiple table architecture, eliminates this requirement. In accordance with this embodiment of the invention, there are three tables: a topic table, a keyword phrase table, and a behavior table.

An example of a topic table is shown below as Table 5.

TABLE 5

| Topic ID | Topic URL | Topic Type |
|---|---|---|
| 1 | m.htm | 1 (model) |
| 2 | vw.htm | 2 (make) |
| 3 | fd.htm | 2 (make) |
| 4 | lm.htm | 1 (model) |
| 5 | pc.htm | 3 (feature) |
| 6 | no.htm | 7 (special) |
| 7 | bk.htm | 6 (glossary) |

The topic table has an entry (row) for each topic resource. Each entry has fields corresponding to a topic ID number, an associated topic URL, and a topic type. In the current embodiment of the invention, there are seven topic types as follows:

1. Model
2. Make
3. Feature Article
4. News Article
5. Shopping Article
6. Glossary
7. Special (for "no-response" topics)

These types correspond to different types of topics available to the server.

An example of a keyword phrase table in accordance with this embodiment of the invention is shown below as Table 6.

TABLE 6

| Keyword Phrase | Phonetic Spelling | Topic ID | Category |
|---|---|---|---|
| Mustang | tlhv | 1 | 1 |
| VW | da | 2 | 2 |
| Ford | esg | 3 | 1 |
| Lumina | rtu | 4 | 1 |
| Pony Car | pncr | 5 | 2 |
| Lemon | rtu | 6 | 1 |
| Bucket Seats | bohlhl | 7 | 2 |

Each entry of the phrase table corresponds to a keyword phrase. In addition to the keyword phrase, each entry indicates a topic ID (referencing the topic table), the phonetic spelling of the keyword phrase, and an entry categorization.

An example of a behavior table is shown below as Table 7.

TABLE 7

| Type | Category | Action A (char) | Action B (phonetic) | Action C (phonetic) |
|---|---|---|---|---|
| 1 | 1 | 1 | 2 | 2 |
| 2 | 0 | 1 | 2 | 2 |
| 3 | 0 | 1 | 2 | 2 |
| 1 | 2 | 2 | 0 | 0 |
| 4 | 1 | 2 | 2 | 2 |
| 4 | 2 | 3 | 3 | 2 |
| 5 | 1 | 2 | 2 | 2 |
| 5 | 2 | 3 | 3 | 2 |
| 6 | 0 | 4 | 4 | 2 |
| 7 | 1 | 1 | 0 | 0 |

The behavior table has indexed fields corresponding to topic type and entry categorization. A category value of 0 in Table 7 indicates that the corresponding entry applies to any category within the given type. For each possible combination of topic type and entry categorization (there are only two possible entry categorizations in this embodiment of the invention—1 and 2), the table indicates one or more alternative action codes, corresponding to character matches, phonetic matches and rough matches.

In accordance with this embodiment, each phrase table entry is associated with one or more actions as described in the previous embodiment. However, the actions are found by first determining the topic type of the topic indicated by the entry and determining the entry categorization of the entry. These parameters are used to index the behavior table to find the appropriate action code.

This feature allows different keyword phrases to be easily categorized without specifically entering the action codes for each phrase. In a simple implementation, there is only one possible value for the entry categorization, and the appropriate actions are determined from the topic types. Thus, it is only necessary to categorize the topics by type to specify actions to be performed when individual topics are matched in a search. In a slightly more complex embodiment of the invention, there are two possible entry categorization values. This allows a content designer to provide different actions depending on which keyword phrase was used to find the topic.

Overall Search and Navigation Summary

Figure 8:
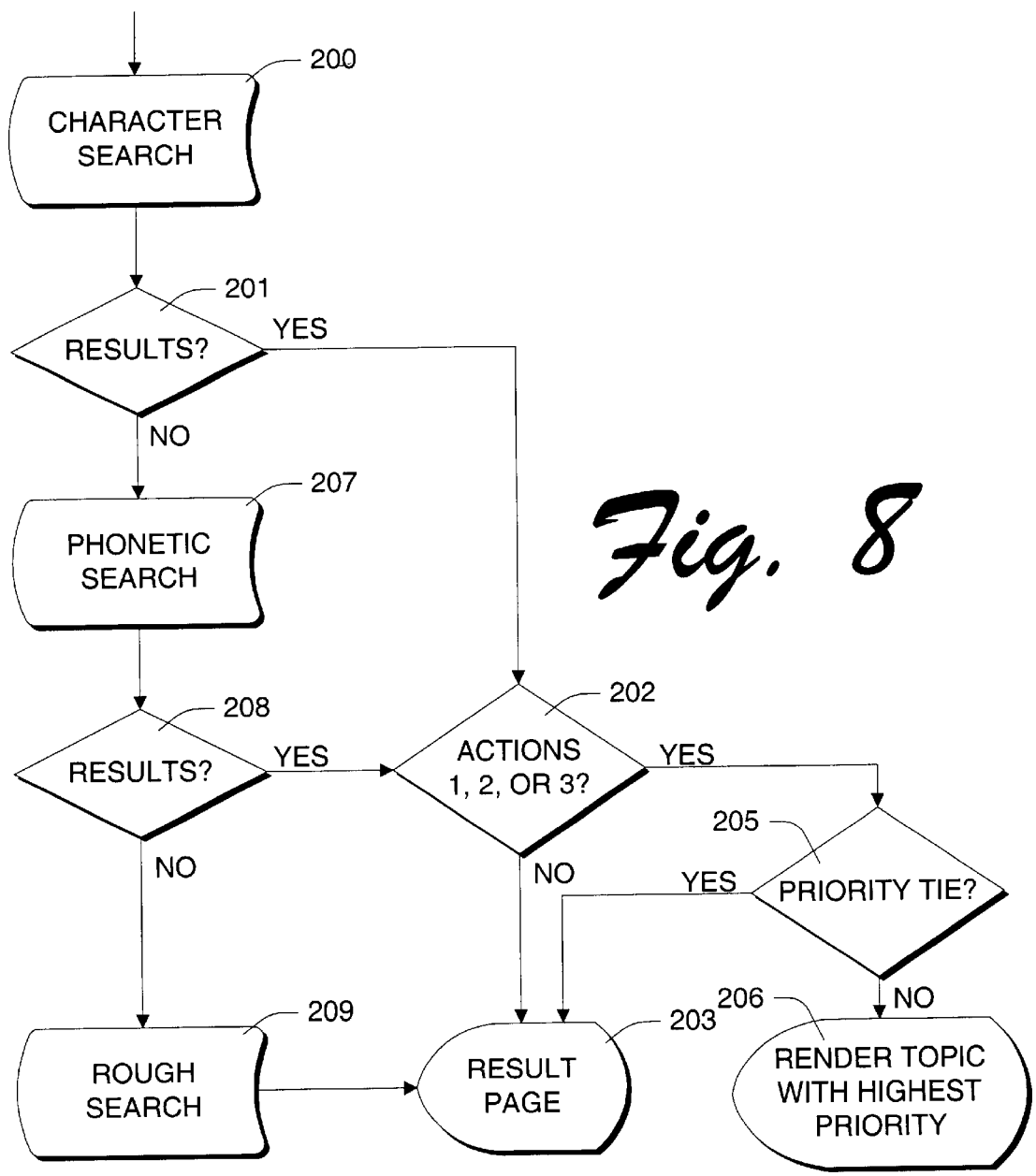
FIG. 8 is a flowchart summarizing a method in accordance with the invention of searching for different topics and navigating to those topics or displaying them on a results page.

The different invention aspects described above can be integrated to form an effective search and navigation strategy. FIG. 8 shows an example of such a search and navigation strategy. A step 200 comprises matching a search phrase provided by a user with one or more keyword phrases in a keyword phrase table, using a character matching search to find an exact character match for the search phrase. If step 200 yields one or more matching table entries (step 201), a step 202 is performed of determining whether any character match actions associated with the matching table entries have priorities of 1, 2, or 3. If they do not, execution branches to step 203, which comprises displaying a result page such as shown in FIG. 7. If there is a priority of 1, 2, or 3, execution proceeds from block 202 to another decision 205, which determines whether there is a tie between the matched entries for the action having the highest priority. If there is a tie, step 203 is performed. If there is not a tie, a step 206 is performed of automatically rendering the topic specified by the table entry having the action with the highest priority.

If the result of step, 201 is negative, indicating that the character search yielded no results, a step 207 is performed, comprising a phonetic matching search for matching keyword phrases and their keyword phrase table entries. If step 207 yields one or more matching table entries (step 208), execution branches to step 202 (which in this case will evaluate the phonetic match actions).

If the result of step 208 is negative, indicating that the phonetic search yielded no results, a step 209 is performed, comprising a rough search. After the rough search, step 210 is performed of displaying the result page. As described above, the rough search will always match one or more entries, which will be listed according to their rough match actions in the result page. Generally, in compiling the result page, the search engine will organize the various matched topics according to their actions.

Note that this strategy handles three different scenarios. In response to matching a search phrase! to a single keyword phrase as a result of the character matching search 200 or the phonetic matching search 207, the search engine initiates the action associated with the single keyword phrase. In response to matching the search phrase to one or more keyword phrases as a result of the rough match search 209, the search engine lists references to the topic resources associated with the one or more keyword phrases for potential selection by a user, regardless of the actions associated with the multiple keyword phrases. In response to matching the search phrase to multiple keyword phrases (as a result of any type of search), the search engine lists references to the topic resources associated with the multiple keyword phrases for potential selection by a user, again regardless of the actions associated with the multiple keyword phrases.

Phonetic Sorting

The invention includes a method of phonetically representing search phrases for phonetic matching purposes and of searching keyword phrases based on a search phrase. Generally, the method comprises the following steps:

(a) Identifying phoneme sequences of the search phrase and of the keyword phrases;

(b) Ordering the search phrase among the plurality of keyword phrases based in the identified phoneme sequences of the search phrase and the keyword phrases, in accordance with a phonetic search order in which similar sounding phonemes are adjacent each other;

(c) Identifying one or a pair of the keyword phrases that are adjacent the search phrase in the phonetic search order.

In accordance with this aspect of the invention, a keyword phrase table such as described above includes a phonetic representation of its keyword phrase. Generally, the phonetic representation is arrived at by changing the characters of the phrase in accordance with a pre-defined character mapping. The mapping maps individual phoneme s to alphanumeric characters so that an alphabetic sort of the resulting phonetic representations results in the desired phonetic search order. The phonetic search order is chosen, as described in more detail below, so that similar sounds are located near each other. In addition, the search order begins with sounds made toward the front of the mouth and continues in order with sounds made farther and farther back in the mouth. After changing or re-mapping the characters of the phrases, the phrases can be phonetically sorted with a simple alphabetic sort to implement this search order.

Figure 9:
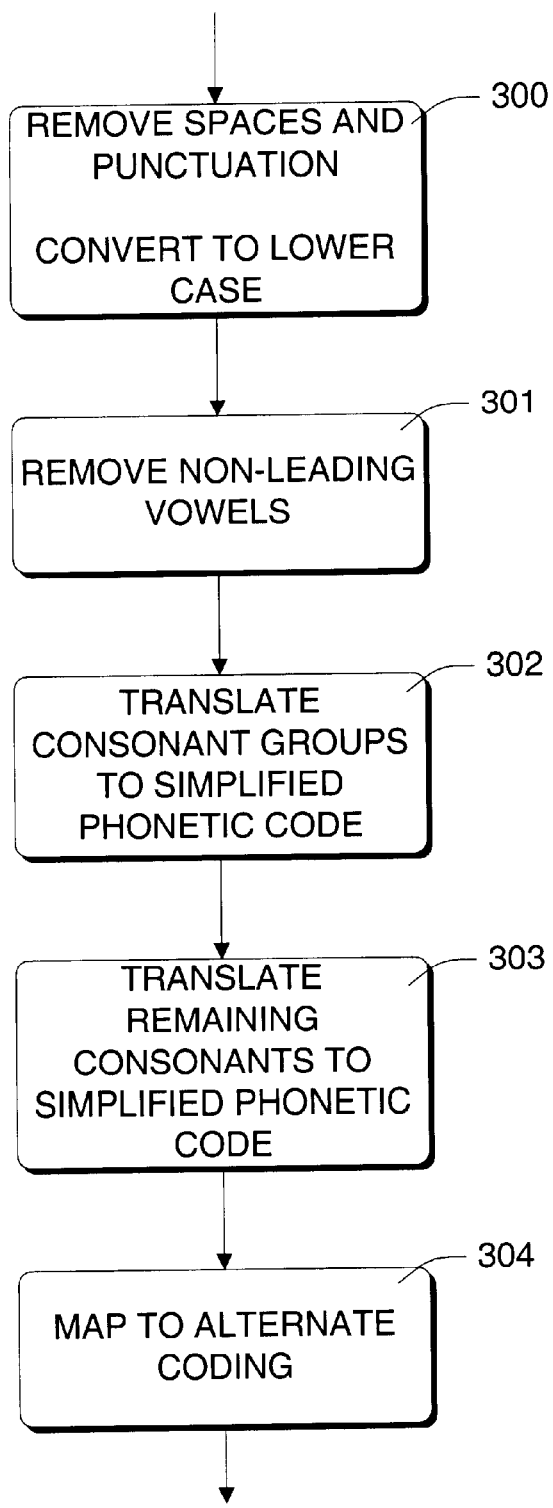
FIG. 9 is a flowchart showing a method of converting search phrases to phonetic representations in accordance with the invention.

FIG. 9 shows the steps in accordance with the invention for creating a phonetic representation of a search phrase or a keyword phrase.

A first step 300 comprises removing spaces and punctuation, and converting all characters to lower case. A step 301 comprises removing any non-leading vowels ("a", "e", "i", "o", "u", and "y") from the keyword phrase—removing all vowels unless they occur as the first character in the keyword phrase.

A step 302 comprises changing or translating individual consonant groups of the keyword phrase to a simplified phonetic code having characters representing basic sounds of speech. The term "consonant group" indicates two or more consonants that are articulated as a single sound, such as "ch", "ng", "sch", etc. Single-sound consonant pairs, such as "BB", "CC", and others are also changed or mapped to single characters.

Step 303 comprises translating or changing remaining consonants of the search phrase to the simplified phonetic code.

Table 8 shows how translation steps 301, 302 and 303 are accomplished. Characters from the string, referred to in the table as "input characters" are converted to the "phonetic characters" in the matching row of the table. Thus, the simplified phonetic code includes the characters listed under the "phonetic characters" headings of Table 8.

TABLE 8

| Input Character | Phonetic Character | Input Character | Phonetic Character |
|---|---|---|---|
| a | remove | gh | H |
| b | B | ck | K |
| c | K | bb | B |
| d | D | cc | K |
| e | remove | dd | D |
| f | F | ff | F |
| g | G | gg | G |
| h | H | hh | H |
| i | remove | jj | J |
| j | J | kk | K |
| k | K | ll | L |
| l | L | mm | M |
| m | M | nn | N |
| n | N | pp | P |
| o | remove | rr | R |
| p | P | ss | S |
| q | K | tt | T |
| r | R | vv | V |
| s | S | ww | W |
| t | T | xx | X |
| u | remove | zz | Z |
| v | V | 0 | 0 |
| w | W | 1 | 1 |
| x | X | 2 | 2 |
| y | remove | 3 | 3 |
| z | Z | 4 | 4 |
| ch | @ | 5 | 5 |
| sh | $ | 6 | 6 |
| th | % | 7 | 7 |
| ng | & | 8 | 8 |
| ph | F | 9 | 9 |

As shown in FIG. 9, the consonant groups and pairs are translated first, followed by any remaining consonants.

After steps 302 and 303, the keyword string has been translated to a phonetic spelling. A further step 304 comprises mapping each character of the phonetic spelling to an alternate coding to provide a new sort order based on a linguistic pattern. Specifically, the consonant characters of the simplified phonetic code described above are sorted to start with sounds made at the front of the mouth and proceeding in order with sounds made farther and farther back in the mouth. One example proceeds in the following order: bilabial sounds, labio-dental sounds, dental sounds, alveolar sounds, postalveolar sounds, velar sounds, and glottal consonant sounds. Approximant and nasal consonants are each grouped together, and sorted after other consonants.

More specifically, the sort order begins with the "W" sound, which is produced at the far front of the mouth. The "W" sound is referred to as a labio-velar approximant or a bilabial fricative. The bilabial stops, "B" and "P" are produced slightly farther toward the rear of the mouth. Next come the labio-dental fricatives "V" and "F", followed by the dental fricative "Th". The alveolar stops "D" and "T" are next, followed by the postalveolar affricates "J" and "Ch", the alveolar fricatives "Z", "S", the postalveolar fricative "Sh", the velar stops "G" and "K", the velar affricate "X" and the glottal fricative "H". The last few consonants are put at the end of the sort order, near each other: alveolar and postalveolar approximants "L" and "R" and nasals "M", "N", and "Ng". Vowels are located at the start of the sort order, and numbers are listed at the end of the sort order. The resulting sort order is as follows:

A E I O U Y W B P V F Th D T J Ch Z S Sh G K X H L R M N Ng 0 1 2 3 4 5 6 7 8 9

To accomplish this sort order, these characters are mapped or further translated to sequential characters of the available character set. Specifically, the characters of the simplified phonetic code are remapped as follows:

TABLE 9

| Phonetic Character | Remapped Character | Phonetic Character | Remapped Character |
|---|---|---|---|
| A | ! | v | D |
| E | # | F | E |
| I | $ | % (Th) | F |
| O | % | D | G |
| U | & | T | H |
| Y | + | J | I |
| 0 | 0 | @ (Ch) | J |
| 1 | 1 | Z | K |
| 2 | 2 | S | L |
| 3 | 3 | $ (Sh) | M |
| 4 | 4 | G | N |
| 5 | 5 | K | O |
| 6 | 6 | X | P |
| 7 | 7 | H | Q |
| 8 | 8 | L | R |
| 9 | 9 | R | S |
| W | A | M | T |
| B | B | N | U |
| P | C | & (Ng) | V |

As an example, consider the keyword phrase "sierra pickup". In accordance with step 300, all spaces are removed, resulting in "sierrapickup". As indicated by step 301, non-leading vowels are removed, leaving "srrpckp". Step 302 translates consonant groups in accordance with Table 8, yielding "sRpKp". The remaining consonants are translated, producing "SRPKP" (no changes in this example). Although steps 300–303 are shown as being sequential in the flowchart of FIG. 9, they are actually performed in one pass to avoid mistaken identification of consonant groups. Finally, Table 9 is used to remap these characters to "LSCOC".

Note that the remapping shown above is one of several different possible remappings. Alternatively, voiced consonants can be ordered prior to their voiceless counterparts, yielding the sort order:

A E I O U Y W P B F V Th T D Ch J S Z
Sh K G X H L R M N Ng 0 1 2 3 4 5 6 7 8
9

Furthermore, the described concepts can be effectively used to formulate phonetic remappings that are workable with different languages.

Figure 10:
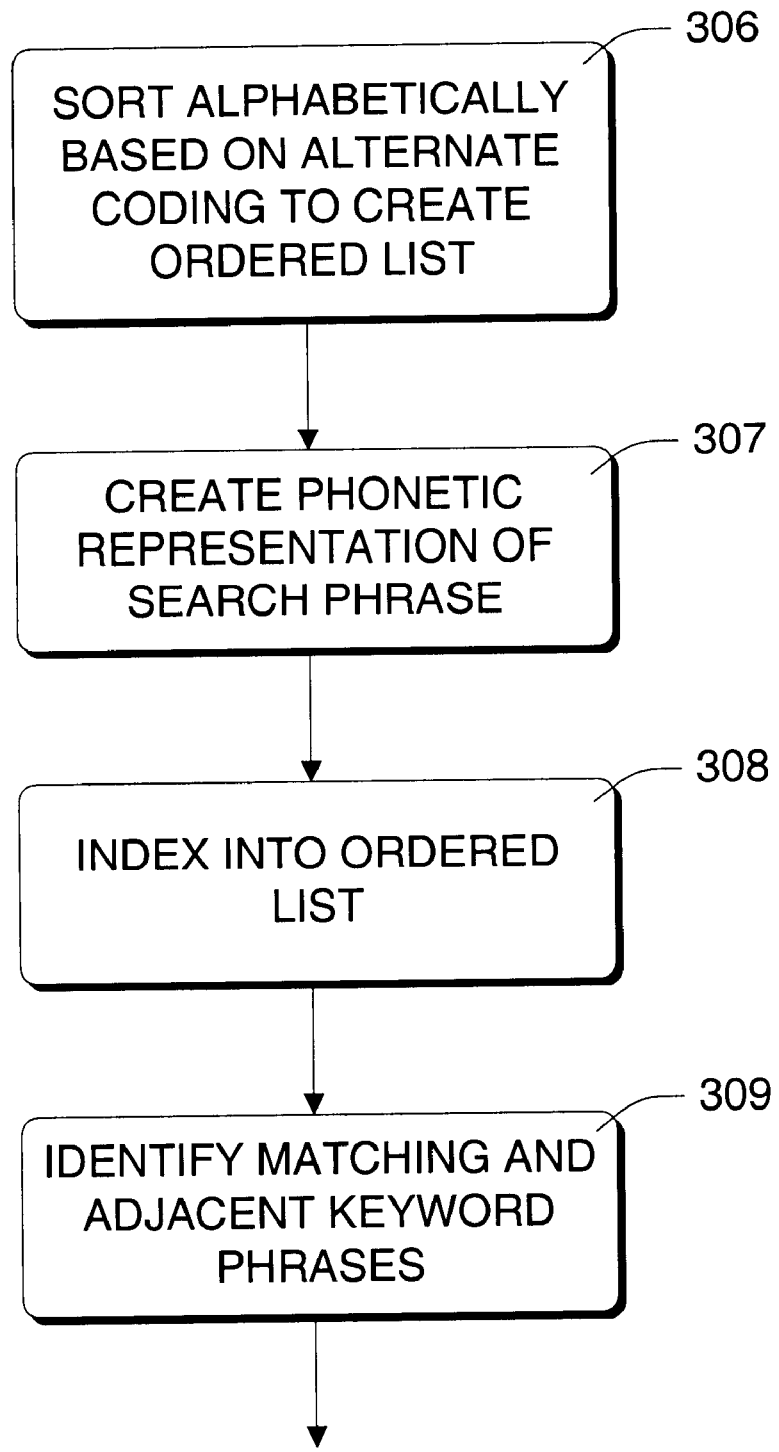
FIG. 10 is a flowchart showing steps involved in searching for keyword phrases based on a search phrase.

FIG. 10 shows steps performed in identifying keyword phrases based on a search phrase. A step 306 comprises sorting the keyword table based on its phonetic keyword representations. Because of the character remapping, the sorting can be accomplished by way of a conventional alphabetic or alphanumeric sort algorithm. This orders the keyword phrases based on their phonetic representations, in the desired search order in which similar sounds are grouped together and are ordered by where they are produced in the mouth. Step 306 results in a sorted list oft keyword phrases that is used for looking up search phrases.

Step 307 comprises formulating a phonetic representation of the search phrase, using the translations and tables already described (steps 300–304). Step 308 comprises indexing into the sorted list of keyword phrases with the phonetic representation of the search phrase to find the ordered location of the search phrase in the sorted list. In step 309, the nearest neighbors of the search phrase are identified as search results. Specifically, matching keyword phrases are identified, along with one or more adjacent keyword phrases. More specifically, matching phrases and any immediately preceding or succeeding keyword phrases are identified as valid search. results, and the corresponding resources are returned to the user.

Note that the two remappings described above (Tables 8 and 9) can be combined and performed in a single remapping step in accordance with Table 10 below, wherein each "input character" (including defined consonant groups and pairs) is changed to the indicated "remapped character":

TABLE 10

| Input Character | Remapped Character | Input Character | Remapped Character |
|---|---|---|---|
| a | remove | gh | Q |
| b | B | ck | O |
| c | O | bb | B |
| d | G | cc | O |
| e | remove | dd | G |
| f | E | ff | E |
| g | N | gg | N |
| h | Q | hh | Q |
| i | remove | jj | I |
| j | I | kk | O |
| k | O | ll | R |
| l | R | mm | T |
| m | T | nn | U |
| n | U | pp | C |
| o | remove | rr | S |
| p | C | ss | L |
| q | O | tt | H |
| r | S | vv | D |
| s | L | ww | A |
| t | H | xx | P |
| u | remove | zz | K |
| v | D | 0 | 0 |
| w | A | 1 | 1 |
| x | P | 2 | 2 |
| y | remove | 3 | 3 |
| z | K | 4 | 4 |
| ch | J | 5 | 5 |

TABLE 10-continued

| Input Character | Remapped Character | Input Character | Remapped Character |
|---|---|---|---|
| sh | M | 6 | 6 |
| th | F | 7 | 7 |
| ng | V | 8 | 8 |
| ph | E | 9 | 9 |

In the specific search context described in preceding sections of this description, the keyword, phrase entries are sorted according to their phonetic keyword phrase representations. A search phrase (or its individual words—see step 152 of FIG. 5) is converted to its phonetic representation using the steps of FIG. 9. It is then compared against the phonetic representations stored in the keyword phrase table, to identify at least one keyword phrase and table entry that is adjacent the search phrase in the defined phonetic search order. Immediately preceding and following phrase entries are then returned as "rough" results of the search. To improve results, phrase table entries whose phonetic representations match the length of the search phrase's phonetic representation are preferred over other entries.

Conclusion

The invention provides significant advantages over prior search schemes. The invention allows different responses depending on how different topics are identified. Closely matching results can be immediately rendered, while more speculative results can be: presented in a results list. Furthermore, a Web site designer has great flexibility in deciding how any particular match will be handled. These features provide a much friendlier environment for users of the Web site. Furthermore, the phonetic sorting employed in the invention allows a search engine to identify likely targets of a search even when a search phrase is misspelled.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method of identifying keyword phrases based on a search phrase, comprising the following steps:
   identifying phoneme sequences of the search phrase and of the keyword phrases;
   ordering the search phrase among the keyword phrases based on the identified phoneme sequences of the search phrase and the keyword phrases, in accordance with a phonetic search order in which similar sounding phonemes are adjacent each other;
   identifying at least one of the keyword phrases that is adjacent the search phrase in the phonetic search order.

2. A method as recited in claim 1, wherein the identifying step comprises identifying at least a pair of the keyword phrases that are adjacent the search phrase in the phonetic search order.

3. A method as recited in claim 1, wherein the phrases are represented by characters, and wherein the ordering step comprises:
   changing the characters of the phrases in accordance with a pre-defined character mapping;
   sorting the phrases alphabetically after changing the characters of the phrases;

wherein the pre-defined character mapping establishes the phonetic search order in accordance with an alphabetic order of the characters.

4. A method as recited in claim 1, wherein the phrases are represented by characters, and wherein the ordering step comprises:
changing the characters of the phrases in accordance with a pre-defined character mapping;
wherein the mapping indicates at least the following character changes: W to A; WW to A; BB to B; P to C; PP to C; V to D; VV to D; F to E; FF to E; PH to E; TH to F; D to G; DD to G; T to H; TT to H; J to I; JJ to I; CH to J; Z to K; S to L; SH to M; SS to L; G to N; GG to N; C to O; CC to O; CK to O; K to O; KK to O; Q to O; X to P; XX to P; GH to Q; H to Q; HH to Q; L to R; LL to R; R to S; RR to S; M to T; MM to T; N to U; NN to U; and NG to V;
sorting the phrases alphabetically after changing the characters of the phrases.

5. A method as recited in claim 1, wherein the phrases are represented as strings of characters, and wherein the ordering step comprises:
changing the characters of the phrases in accordance with a pre-defined character mapping;
sorting the phrases alphabetically after changing the characters of the phrases;
wherein the pre-defined character mapping changes single-sound consonant pairs to single characters.

6. A method as recited in claim 1, wherein the phonetic search order begins with sounds made at the front of the mouth and continues in order with sounds made farther and farther back in the mouth.

7. A method as recited in claim 1, wherein the phonetic search order begins with bilabial consonant sounds made at the front of the mouth, and continues in order through labio-dental, dental, alveolar, postalveolar, velar, and glottal consonant sounds made farther and farther back in the mouth.

8. A method as recited in claim 1, wherein the phonetic search order comprises, in the order given:
bilabial fricatives;
bilabial stops;
labio-dental fricatives;
dental fricatives;
alveolar stops;
postalveolar affricates;
alveolar fricatives;
postalveolar fricatives;
velar stops;
velar affricates;
glottal fricatives;
alveolar approximants;
postalveolar approximants; and
nasals.

9. A method as recited in claim 1, wherein the phonetic search order comprises, in the order given:
bilabial fricatives;
bilabial stops;
labio-dental fricatives;
dental fricatives;
alveolar stops;
postalveolar affricates;
alveolar fricatives;
postalveolar fricatives;
velar stops;
velar affricates; and
glottal fricatives.

10. A method as recited in claim 1, wherein the phonetic search order comprises the following sounds, in the order given:
bilabial fricatives;
bilabial stops;
labio-dental fricatives;
dental fricatives;
alveolar stops;
postalveolar affiicates;
alveolar fricatives;
postalveolar fricatives;
velar stops;
velar affricates; and
glottal fricatives;
wherein the ordering step comprises:
changing the characters of the phrases in accordance with a pre-defined character mapping that maps said sounds to sequential characters of a character set;
sorting the phrases alphabetically after changing the characters of the phrases.

11. A computer,-readable storage medium containing instructions that are executable to select resources based on a search phrase, wherein one or more keyword phrases are associated with each resource, the instructions performing steps comprising:
identifying phoneme sequences of the keyword phrases;
sorting the keyword phrases based on their identified phoneme sequences to form a phonetically ordered list of keyword phrases, in accordance with a phonetic search order in which similar sounding phonemes are adjacent each other;
identifying a phoneme sequence of the search phrase;
indexing into the phonetically ordered list of keyword phrases based on the phoneme sequence of the search phrase, to identify at least one keyword phrase that is adjacent the search phrase in the phonetic search order;
selecting the resource associated with the identified keyword phrase.

12. A computer-readable storage medium as recited in claim 11, wherein the indexing step identifies at least a pair of the keyword phrases that are adjacent the search phrase in the phonetic search order.

13. A computer-readable storage medium as recited in claim 11, wherein the phrases are represented by characters, and wherein the sorting step comprises:
changing the characters of the keyword phrases in accordance with a pre-defined character mapping;
sorting the keyword phrases alphabetically after changing the characters of the keyword phrases;
wherein the pre-defined character mapping establishes the phonetic search order in accordance with an alphabetic order of the characters.

14. A computer-readable storage medium as recited in claim 11, wherein the phrases are represented by characters, and wherein the sorting step comprises:
changing the characters of the keyword phrases in accordance with a pre-defined character mapping;
wherein the mapping indicates at least the following character changes: W to A; WW to A; BB to B; P to C; PP to C; V to D; VV to D; F to E; FF to E; PH to E; TH to F; D to G; DD to G; T to H; TT to H; J to I; JJ to I; CH to J; Z to K; S to L; SH to M; SS to L; G to N; GG to N; C to O; CC to O; CK to O; K to O; KK to O; Q to O; X to P; XX to P; GH to Q; H to Q; HH to Q; L to R; LL to R; R to S; RR to S; M to T; MM to T; N to U; NN to U; and NG to V;

sorting the keyword phrases alphabetically after changing the characters of the phrases.

15. A computer,-readable storage medium as recited in claim 11, wherein the phrases are represented as strings of characters, and wherein the sorting step comprises:

changing the characters of the keyword phrases in accordance with a pre-defined character mapping;

sorting the keyword phrases alphabetically after changing the characters of the keyword phrases;

wherein the pre-defined character mapping changes single-sound consonant pairs to single characters.

16. A computer-readable storage medium as recited in claim 11, wherein the phonetic search order begins with sounds made at the front of the mouth and continues in order with sounds made farther and farther back in the mouth.

17. A computer-readable storage medium as recited in claim 11, wherein the phonetic search order begins with bilabial consonant sounds made at the front of the mouth, and continues in order through labio-dental, dental, alveolar, postalveolar, velar, and glottal consonant sounds made farther and farther back in the mouth.

18. A computer-readable storage medium as recited in claim 11, wherein the phonetic search order comprises, in the order given:

bilabial fricatives;
bilabial stops;
labio-dental fricatives;
dental fricatives;
alveolar stops;
postalveolar affricates;
alveolar fricatives;
postalveolar fricatives;
velar stops;
velar affricates;
glottal fricatives;
alveolar approximants;
postalveolar approximants; and
nasals.

19. A computer-readable storage medium as recited in claim 11, wherein the phonetic search order comprises, in the order given:

bilabial fricatives;
bilabial stops;
labio-dental fricatives;
dental fricatives;
alveolar stops;
postalveolar affricates;
alveolar fricatives;
postalveolar fricatives;
velar stops;
velar affricates; and,
glottal fricatives.

20. A computer-readable storage medium as recited in claim 11, wherein the phonetic search order comprises the following sounds, in the order given:

bilabial fricatives;
bilabial stops;
labio-dental fricatives;
dental fricatives;
alveolar stops;
postalveolar affricates;
alveolar fricatives;
postalveolar fricatives;
velar stops;
velar affricates; and
glottal fricatives;

wherein the sorting step comprises:

changing the characters of the keyword phrases in accordance with a pre-defined character mapping that maps said sounds to sequential characters of a character set;

sorting the keyword phrases alphabetically after changing the characters of the keyword phrases.

21. One or more network servers comprising:

a plurality of topic resources;

a keyword table having a plurality of entries, wherein each entry is associated with one of the topic resources, wherein each entry has a keyword phrase, and wherein each entry also has a phonetic representation of its keyword phrase;

the entries being ordered by their phonetic keyword representations in accordance with a phonetic search order in which similar sounding phonemes are adjacent each other;

a search engine that accepts a search phrase and that finds one or more corresponding target entries in the keyword table by performing a phonetic matching search, the phonetic matching search comprising the following steps:

formulating a phonetic representation of the search phrase;

indexing into the keyword table based on the phonetic representation of the search phrase, to identify at least one keyword table entry whose phonetic keyword phrase representation is adjacent the phonetic search phrase representation in the phonetic search order;

selecting the resource associated with the identified keyword table entry.

22. One or more network servers as recited in claim 21, wherein the indexing step identifies at least a pair of the keyword table entries whose phonetic keyword phrase representations are adjacent the phonetic search phrase representation in the phonetic search order.

23. One or more network servers as recited in claim 21, wherein each phonetic representation comprises a phoneme sequence.

24. One or more network servers as recited in claim 21, wherein each phonetic representation comprises a string of characters, each character representing a single phoneme.

25. One or more network servers as recited in claim 21, wherein the keyword phrases comprise character strings, and wherein the phonetic representations are created in accordance with steps comprising:

changing the characters of the keyword phrases in accordance with a pre-defined character mapping;

wherein the pre-defined character mapping establishes the phonetic search order in accordance with an alphabetic order of the characters.

26. One or more network servers as recited in claim 21, wherein the keyword phrases comprises character strings, and wherein the phonetic representations are created in accordance with steps comprising:

changing the characters of the keyword phrases in accordance with a pre-defined character mapping;

wherein the mapping indicates at least the following character changes: W to A; WW to A; BB to B; P to C; PP to C; V to D; VV to D; F to E; FF to E; PH to E; TH to F; D to G; DD to G; T to H; TT to H; J to I; JJ to I; CH to J; Z to K; S to L; SH to M; SS to L; G to N; GG to N; C to O; CC to O; CK to O; K to O; KK to O; Q to O; X to P; XX to P; GH to Q; H to Q; HH to Q; L to R; LL to R; R to S; RR to S; M to T; MM to T; N to U; NN to U; and NG to V;

wherein the keyword entries are sorted alphabetically by their phonetic keyword representations after changing the characters of the phrases.

27. One or more network servers as recited in claim 21, wherein the phonetic search order begins with sounds made at the front of the mouth and continues in order with sounds made farther and farther back in the mouth.

28. One or more network servers as recited in claim 21, wherein the phonetic search order begins with bilabial consonant sounds made at the front of the mouth, and continues in order through labio-dental, dental, alveolar, postalveolar, velar, and glottal consonant sounds made farther and farther back in the mouth.

29. One or more network servers as recited in claim 21, wherein the phonetic search order comprises, in the order given:

bilabial stops;
    labio-dental fricatives;
    dental fricatives;
    alveolar stops;
    postalveolar affricates;
    alveolar fricatives;
    postalveolar fricatives;
    velar stops;
    velar affricates;
    glottal fricatives;
    alveolar approximants;
    postalveolar approximants; and
    nasals.

30. One or more network servers as recited in claim 21, wherein the phonetic search order comprises, in the order given:

bilabial fricatives;
    bilabial stops;
    labio-dental fricatives;
    dental fricatives;
    alveolar stops;
    postalveolar affricates;
    alveolar fricatives;
    postalveolar fricatives;
    velar stops;
    velar affricates; and
    glottal fricatives.

31. One or more network servers as recited in claim 21, wherein the phonetic search order comprises the following sounds, in the order given:

labial stops;
    bilabial fricatives;
    bilabial stops;
    labio-dental fricatives;
    dental fricatives;
    alveolar stops;
    postalveolar affricates;
    alveolar fricatives;
    postalveolar fricatives;
    velar stops;
    velar affricates; and
    glottal fricatives;

wherein the keyword phrases comprises character strings, and wherein the phonetic representations are created by changing the characters of the keyword phrases in accordance with a pre-defined character mapping that maps said sounds to sequential characters of a character set.

* * * * *

UNITED STATES PATENT AND TRADEMARK OFFICE
CERTIFICATE OF CORRECTION

PATENT NO.     : 6,408,270 B1                                    Page 1 of 1
DATED          : June 18, 2002
INVENTOR(S)    : Garber It is certified that error appears in the above-identified patent and that said Letters Patent is hereby corrected as shown below:

<u>Column 9,</u>
Line 67, replace ""Lemon"" with -- "Lemmon" --.

<u>Column 11,</u>
Line 46, replace "hyerlink" with -- hyperlink --.

<u>Column 14,</u>
Line 54, replace "phoneme s" with -- phonemes --.

<u>Column 20,</u>
Line 14, "affiicates;" with -- affricates; --.

Signed and Sealed this

Twenty-eighth Day of January, 2003

JAMES E. ROGAN
*Director of the United States Patent and Trademark Office*